United States Patent
Oosawa et al.

(10) Patent No.: US 12,331,182 B2
(45) Date of Patent: Jun. 17, 2025

(54) RESIN COMPOSITION AND RESIN-ATTACHED COPPER FOIL

(71) Applicant: MITSUI MINING & SMELTING CO., LTD., Tokyo (JP)

(72) Inventors: Kazuhiro Oosawa, Ageo (JP); Haruka Makino, Ageo (JP); Kuniharu Ogawa, Ageo (JP)

(73) Assignee: MITSUI MINING & SMELTING CO., LTD., Tokyo (JP)

( * ) Notice: Subject to any disclaimer, the term of this patent is extended or adjusted under 35 U.S.C. 154(b) by 821 days.

(21) Appl. No.: 17/442,330

(22) PCT Filed: Mar. 5, 2020

(86) PCT No.: PCT/JP2020/009319
§ 371 (c)(1),
(2) Date: Sep. 23, 2021

(87) PCT Pub. No.: WO2020/195661
PCT Pub. Date: Oct. 1, 2020

(65) Prior Publication Data
US 2022/0169842 A1 Jun. 2, 2022

(30) Foreign Application Priority Data

Mar. 28, 2019 (JP) .................. 2019-063436

(51) Int. Cl.
| | | |
|---|---|---|
| C08L 23/0869 | (2025.01) | |
| B05D 7/26 | (2006.01) | |
| B32B 17/10 | (2006.01) | |
| C08L 33/06 | (2006.01) | |

(52) U.S. Cl.
CPC ............ C08L 23/0869 (2013.01); B05D 7/26 (2013.01); B32B 17/10 (2013.01); C08L 33/064 (2013.01); B05D 2202/45 (2013.01); B05D 2203/35 (2013.01); C08L 2201/10 (2013.01); C08L 2205/035 (2013.01); C08L 2312/06 (2013.01)

(58) Field of Classification Search
CPC ..... C08L 23/0869; C08L 33/064; B05D 7/26; B32B 17/10
See application file for complete search history.

(56) References Cited

U.S. PATENT DOCUMENTS

| | | | |
|---|---|---|---|
| 2007/0264438 A1 | 11/2007 | Kawai | |
| 2011/0033161 A1 | 2/2011 | Ochiai et al. | |
| 2023/0391983 A1* | 12/2023 | Yonekura | B22F 9/008 |

FOREIGN PATENT DOCUMENTS

| | | | |
|---|---|---|---|
| JP | 2003-286391 | 10/2003 | |
| JP | 2007-161811 A | 6/2007 | |
| JP | 2009-175456 | 8/2009 | |
| JP | 2012-042829 | 3/2012 | |
| JP | 2012-097283 | 5/2012 | |
| JP | 2012-128360 | 7/2012 | |
| JP | 2018-182275 | 11/2018 | |
| JP | 2020-037652 | 3/2020 | |
| WO | 2009/093679 | 7/2009 | |
| WO | 2017/138379 | 8/2017 | |
| WO | 2018/026556 | 2/2018 | |
| WO | WO-2019220540 A1 * | 11/2019 | H01L 21/561 |

OTHER PUBLICATIONS

NK Ester List, available at https://www.shin-nakamura.com/en/products/nkester (accessed Aug. 3, 2024) (Year: 2024).*
Kanie T. et al., Mechanical properties and cytotoxicity of experimental soft lining materials based on urethane acrylate oligomers, 28(4) Dent. Mater. J. 501 (Year: 2009).*
Denamer 1220 Presentation Deck (https://denamer.nsm-na.com/NSM%20Denamer%201220%20Presentation%20Deck.pdf, accessed Aug. 4, 2024) (Year: 2024).*
JP 7,136,200 (JPO transl.) (Year: 2022).*
Office Action issued in CN Patent Application No. 202080021118.6, Oct. 10, 2022, (translation).
Sun Maoshu et al., "University Physics Experiment," Beijing University of Posts and Telecommunications Press, p. 74, Jan. 2018 (discussed in CN Office Action).

* cited by examiner

*Primary Examiner* — Robert C Boyle
*Assistant Examiner* — Patrick Loen Benitez
(74) *Attorney, Agent, or Firm* — GREENBLUM & BERNSTEIN P.L.C.

(57) ABSTRACT

There is provided a resin composition including (a) an acrylic polymer having a tensile modulus of 200 MPa or less, (b) a resin that is solid at 25° C., (c) a resin that is liquid at 25° C. and crosslinkable with at least one of the component (a) or the component (b), and (d) a polymerization initiator. The content of the component (a) is 35 parts by weight or more and 93 parts by weight or less, the content of the component (b) is 3 parts by weight or more and 60 parts by weight or less, and the content of the component (c) is 1 part by weight or more and 25 parts by weight or less, based on 100 parts by weight of the total amount of the component (a), the component (b), and the component (c).

7 Claims, No Drawings

RESIN COMPOSITION AND RESIN-ATTACHED COPPER FOIL

TECHNICAL FIELD

The present invention relates to a resin composition and a resin-attached copper foil.

BACKGROUND ART

Glass substrates are used for flat panel displays such as liquid crystal displays, organic EL displays, plasma displays, field emission displays, and electronic paper, and color filters used for them. Transparency is required of resin compositions applied to such glass substrates because they need to transmit light of colors such as red (R), green (G), and blue (B).

On the other hand, as resin compositions having transparency, resin compositions for the formation of the cladding layers of optical waveguides are known. For example, Patent Literature 1 (WO2009/093679) discloses a resin composition containing (A) a (meth)acrylic polymer having a weight average molecular weight exceeding 100,000, (B) a urethane (meth)acrylate, and (D) a radical polymerization initiator and states that the component (A) can be an epoxy group-containing (meth)acrylic polymer. Patent Literature 2 (JP2009-175456A) discloses a resin composition containing (A) a (meth)acrylic polymer having a reactive functional group and having a weight average molecular weight of 100,000 or more, (B) an alicyclic epoxy resin, and (C) a cationic polymerization initiator, wherein the component (B) includes 50% by mass or more of an alicyclic epoxy resin that is liquid at room temperature. Patent Literature 3 (JP2012-42829A) discloses a resin composition including (A) a polymer having a carboxyl group, (B) a urethane (meth)acrylate, (C) a compound having two or more epoxy groups in the molecule, and (D) a radical polymerization initiator and states that the component (C) can be a polyfunctional alicyclic alcohol glycidyl ether or a polyfunctional heterocyclic epoxy resin.

CITATION LIST

Patent Literature

Patent Literature 1: WO2009/093679
Patent Literature 2: JP2009-175456A
Patent Literature 3: JP2012-42829A

SUMMARY OF INVENTION

The present inventors have studied, as one of the applications of transparent resin compositions, a transparent primer layer (adhesive layer) affixed to a glass substrate used for the manufacture of a flat panel display or a color filter. The layer of the resin composition is provided in the form of a resin-attached copper foil, and this copper foil can be used as a copper foil for circuit formation. However, when such a resin composition layer is affixed to a glass substrate, warpage is likely to occur in the glass substrate. Therefore, a resin composition that can cause less warpage is desired. In addition, for the resin composition for the above application, adhesion to a glass substrate, adhesion to a copper foil, and processability (for example, break-proof) are also desired. In this manner, various properties are required of the resin composition applied to a glass substrate.

The present inventors have now found that when a resin composition including (a) a predetermined acrylic polymer, (b) a resin that is solid at 25° C., (c) a resin that is liquid at 25° C., and (d) a polymerization initiator in a predetermined blending ratio is affixed to a glass substrate as a resin layer, warpage that occurs in the glass substrate can be reduced, and moreover excellent transparency, excellent adhesion to the glass substrate and a copper foil, and excellent processability are also exhibited.

Therefore, it is an object of the present invention to provide a resin composition that can cause reduced occurrence of warpage in a glass substrate, and moreover also exhibits excellent transparency, excellent adhesion to a glass substrate and a copper foil, and excellent processability, when affixed to a glass substrate as a resin layer.

According to an aspect of the present invention, there is provided a resin composition comprising the following components:
  (a) an acrylic polymer having a tensile modulus of 200 MPa or less as measured in accordance with JIS K7161-1: 2014;
  (b) a resin that is solid at 25° C.;
  (c) a resin that is liquid at 25° C. and crosslinkable with at least one of the component (a) and the component (b); and
  (d) a polymerization initiator,
  wherein the resin composition contains the component (a) in an amount of 35 parts by weight or more and 93 parts by weight or less, the component (b) in an amount of 3 parts by weight or more and 60 parts by weight or less, and the component (c) in an amount of 1 part by weight or more and 25 parts by weight or less, based on 100 parts by weight of a total amount of the component (a), the component (b), and the component (c).

According to another aspect of the present invention, there is provided a resin-attached copper foil comprising:
  a copper foil including a smooth surface; and
  the resin composition provided on the smooth surface.

According to another aspect of the present invention, there is provided a composite material comprising:
  a glass substrate; and
  the resin composition provided on at least one surface of the glass substrate.

DESCRIPTION OF EMBODIMENTS

Resin Composition

The resin composition of the present invention includes an acrylic polymer (hereinafter referred to as a component (a)), a resin that is solid at 25° C. (hereinafter referred to as a component (b)), a resin that is liquid at 25° C. (hereinafter referred to as a component (c)), and a polymerization initiator (hereinafter referred to as a component (d)). The component (a) is an acrylic polymer having a tensile modulus of 200 MPa or less as measured in accordance with JIS K7161-1. The component (c) is a resin that is liquid at 25° C. and crosslinkable with at least one of the component (a) and the component (b). The content of the component (a) is 35 parts by weight or more and 93 parts by weight or less based on 100 parts by weight of the total amount of the component (a), the component (b), and the component (c). The content of the component (b) is 3 parts by weight or more and 60 parts by weight or less, and the content of the component (c) is 1 part by weight or more and 25 parts by weight or less. When the resin composition including (a) the predetermined acrylic polymer, (b) the resin that is solid at 25° C., (c) the resin that is liquid at 25° C., and (d) the polymerization initiator in the predetermined blending ratio in this manner is affixed to a glass substrate as a resin layer, warpage that occurs in the glass substrate can be less, and moreover excellent transparency, excellent adhesion to the glass substrate and a copper foil, and excellent processability are also exhibited.

As described above, the present inventors have studied, as one of the applications of transparent resin compositions, a transparent primer layer (adhesive layer) affixed to a glass substrate used for the manufacture of a flat panel display or a color filter. However, when such a resin composition layer is affixed to a glass substrate, warpage is likely to occur in the glass substrate. Therefore, a resin composition that can cause less warpage is desired. In addition, for the resin composition for the above application, adhesion to a glass substrate, adhesion to a copper foil, and processability (for example, break-proof) are also desired. Particularly, a glass substrate used for a flat panel display or a color filter has very low surface roughness because high transparency is required, and essentially the adhesion between the glass substrate and the resin layer is likely to decrease. Similarly, in order not to impair the transparency of the resin layer, a copper foil having very low surface roughness (for example, a non-roughened copper foil) is used for a resin-attached copper foil for circuit formation, and again, essentially the adhesion between the resin layer and the copper foil is also likely to decrease. Therefore, a resin composition that can also address these problems of adhesion is desired. In addition, also regarding the processability in the above application, desired are properties of the resin-attached copper foil formed, including ease in being wound in a roll-to-roll manner without excessive stickiness, ease in being cut into a sheet shape, and further, less crackability or crushability during cutting. In this manner, various properties are required of the resin composition applied to a glass substrate. In this respect, the above various properties can be achieved in good balance according to the resin composition of the present invention.

The resin composition of the present invention preferably has an elongation at break of 200% or more, more preferably 500% or more, and further preferably 700% or more as measured in accordance with JIS K7161-1: 2014 after curing. When the elongation at break is high as described above, warpage that otherwise occurs in a glass substrate can be more effectively reduced, and excellent adhesion to a glass substrate and a copper foil and processability can also be improved, when the resin composition is affixed to a glass substrate as a resin layer. The upper limit value of the elongation at break is not particularly limited, but the elongation at break is typically 1200% or less, more typically 900% or less. The resin composition of the present invention also preferably has transparency after curing in view of use in a flat panel display or a color filter.

(a) Acrylic Polymer

The component (a) is an acrylic polymer having a tensile modulus of 200 MPa or less. The tensile modulus is measured in accordance with JIS K7161-1: 2014. The component (a) contributes to the improvement of the softness of the resin composition, less warpage when bonded to a glass substrate, and the improvement of peel strength.

The content of the component (a) is 35 parts by weight or more and 93 parts by weight or less, preferably 35 parts by weight or more and 80 parts by weight or less, more preferably 40 parts by weight or more and 70 parts by weight or less, further preferably 40 parts by weight or more and 60 parts by weight or less, and particularly preferably 45 parts by weight or more and 55 parts by weight or less based on 100 parts by weight of the total amount of the component (a), the component (b), and the component (c). When the content of the component (a) is within these ranges, the above-described various properties can be more effectively achieved.

The component (a) is not particularly limited as long as it is an acrylic polymer having a tensile modulus of 200 MPa or less. Examples of such an acrylic polymer include Vamac® series manufactured by DuPont, TEISANRESIN® series manufactured by Nagase ChemteX Corporation, and KURARITY® manufactured by KURARAY CO., LTD. In order to ensure the strength of the resins, the components are preferably chemically bonded to form a crosslinked structure. For crosslinking, a reactive functional group is needed, and the type of the reactive functional group is not particularly limited. For example, when the component (c) is an epoxy resin, a functional group capable of reacting with an epoxy group is preferred in view of adhesion to glass and versatility. As the functional group capable of reacting with an epoxy group, a carboxyl group is preferred in view of colorlessness, and at least one of the component (a) and the component (b) preferably has a carboxyl group. When a functional group including nitrogen such as an amine is used as the functional group capable of reacting with an epoxy group, the resin composition after curing is likely to be colored. Preferred examples of the component (a) having a carboxyl group include Vamac® series G grade, GXF grade, Ultra LS grade, Ultra HT grade, Ultra HT-OR grade, and VMX4017 grade manufactured by DuPont, and TEISANRESIN® series WS-023, SG-280TEM, and SG-70L manufactured by Nagase ChemteX Corporation, and particularly preferably Vamac® series Ultra HT-OR grade manufactured by DuPont.

(b) Resin that is Solid at 25° C.

The component (b) is a resin that is solid at ordinary temperature (specifically 25° C.). The component (b) is a compound different from the component (a), and decreases the stickiness of the resin composition to prevent the resin layer from excessively exhibiting stickiness, to thereby provide excellent processability to the resin composition. For example, when a resin-attached copper foil is formed, it is easily wound in a roll-to-roll manner without resin layer/copper foil blocking due to excessive sticking. The resin that is solid at 25° C. is not particularly limited as long as the glass transition temperature Tg measured by DMA in accordance with JIS K 7095: 2012 is 25° C. or more. The glass transition temperature Tg is typically 30° C. or more, more typically 40° C. or more. The upper limit of the glass transition temperature Tg is not particularly limited either, but the glass transition temperature Tg is preferably 150° C. or less, more preferably 100° C. or less, and further preferably 80° C. or less.

The content of the component (b) is 3 parts by weight or more and 60 parts by weight or less, preferably 15 parts by weight or more and 60 parts by weight or less, more preferably 25 parts by weight or more and 55 parts by weight or less, further preferably 35 parts by weight or more and 50 parts by weight or less, and particularly preferably 40 parts by weight or more and 50 parts by weight or less based on 100 parts by weight of the total amount of the component (a), the component (b), and the component (c). The weight ratio of the component (a) to the component (b), a/b, is preferably 0.6 or more and 18 or less, more preferably 0.6 or more and 6.0 or less, further preferably 0.7 or more and 3.0 or less, particularly preferably 0.9 or more and 1.5 or less, and most preferably 1.0 or more and 1.4 or less. When the content of the component (b) and the weight ratio a/b are within these ranges, the various properties of the present invention described above can be more effectively achieved.

The component (b) is not particularly limited as long as it is a resin that is solid at 25° C. Examples of such a resin include SMA® resins manufactured by Cray Valley, and ARUFON® manufactured by Toagosei Co., Ltd. In view of chemical adhesion, colorlessness (desirably colorless transparency), and crosslinkability, at least one of the component (a) and the component (b) preferably has a carboxyl group. Preferred examples of the component (b) having a carboxyl group include ARUFON® UC-3000 series manufactured by Toagosei Co., Ltd., particularly preferably ARUFON® UC-3900 manufactured by Toagosei Co., Ltd.

(c) Resin that is Liquid at 25° C.

The component (c) is a resin that is liquid at ordinary temperature (specifically 25° C.). The component (c) is a compound crosslinkable with at least one of the component (a) and the component (b) and is typically a monomer or an oligomer. The component (c) improves the adhesion force (adhesion) of the resin composition to a glass substrate and a copper foil to contribute to the improvement of peel strength. The component (c) is not particularly limited as long as it is a compound different from the component (a) and is a resin that is liquid at 25° C. The resin that is liquid at 25° C. is not particularly limited as long as the glass transition temperature Tg measured by DMA in accordance with JIS K 7095: 2012 is less than 25° C. The glass transition temperature Tg is preferably 20° C. or less, more preferably 10° C. or less, and further preferably 0° C. or less. The lower limit value of the glass transition temperature Tg is not particularly limited, but the glass transition temperature Tg is typically −100° C. or more, more typically −70° C. or more.

The content of the component (c) is 1 part by weight or more and 25 parts by weight or less, preferably 1 part by weight or more and 20 parts by weight or less, more preferably 3 parts by weight or more and 15 parts by weight or less, further preferably 4 parts by weight or more and 12 parts by weight or less, and particularly preferably 5 parts by weight or more and 10 parts by weight or less based on 100 parts by weight of the total amount of the component (a), the component (b), and the component (c). When the content of the component (c) is within these ranges, the various properties of the present invention described above can be more effectively achieved.

The component (c) is not particularly limited as long as it is a resin that is liquid at 25° C. and crosslinkable with the component (a) and/or the component (b). Examples of such a resin include liquid epoxy compounds such as EPICLON 850S manufactured by DIC CORPORATION, ADEKA RESIN EP-4000 manufactured by ADEKA Corporation, YDF-170 manufactured by NIPPON STEEL & SUMIKIN CHEMICAL CO., LTD., and EPOLEAD PB4700 and CELLOXIDE 2021P manufactured by DAICEL CORPORATION Organic Chemical Products Company, isocyanate compounds such as Millionate MTL manufactured by Tosoh Corporation, and diamine compounds such as GENAMIN® D01/2000 manufactured by CLARIANT, and preferably liquid alicyclic epoxy compounds such as CELLOXIDE 2021P manufactured by DAICEL CORPORATION Organic Chemical Products Company.

According to a preferred embodiment of the present invention, at least one of the component (a) or the component (b) has a carboxyl group, and the component (c) is a liquid alicyclic epoxy compound. Such features provide the following advantages: the cured product of the resin composition has colorless transparency and toughness, and when the resin composition layer is affixed to a glass substrate used for the manufacture of a flat panel display or a color filter, less warpage, adhesion, and processability are exhibited.

(d) Polymerization Initiator

The component (d) is a polymerization initiator and contributes to the promotion of the crosslinking of the resin components including the component (a), the component (b), and the component (c). The polymerization initiator is not particularly limited as long as it contributes to the crosslinking of the resin components. The weight ratio of the component (c) to the component (d), c/d, is preferably 50 or more and 5000 or less, more preferably 100 or more and 4000 or less, further preferably 500 or more and 3000 or less, particularly preferably 700 or more and 1500 or less, and most preferably 800 or more and 1200 or less.

The polymerization initiator is not particularly limited as long as it can promote the reaction of the component (a) and/or the component (b) with the component (c). Preferred examples include radical polymerization initiators such as imidazoles, azo compounds, and peroxides, and in view of being effective even when used in a small amount and being unlikely to impair transparency, borate-based polymerization initiators typified by SAN-AID SI-B5 manufactured by SANSHIN CHEMICAL INDUSTRY CO., LTD. are more preferred.

Resin-Attached Copper Foil

The resin composition of the present invention is preferably used as the resin of a resin-attached copper foil. By previously providing in the form of a resin-attached copper foil, a member of a display, a color filter, or the like can be efficiently manufactured without separately forming a resin layer. In other words, according to a preferred aspect of the present invention, a resin-attached copper foil including a copper foil including a smooth surface and the resin composition provided on the smooth surface is provided. Typically, the resin composition is in the form of a resin layer. A copper foil is coated with the resin composition using a gravure coating method so that the thickness of the resin layer after drying is a predetermined value, and the resin composition is dried to obtain a resin-attached copper foil. The method of coating is arbitrary, and a gravure coating method or other methods such as a die coating method or a knife coating method can be adopted. A doctor blade, a bar coater, or the like can also be used to perform coating.

The thickness of the resin layer is not particularly limited but is preferably 1 μm or more and 30 μm or less, more preferably 2 μm or more and 20 μm or less, particularly preferably 3 μm or more and 10 μm or less, and most preferably 4 μm or more and 8 μm or less. When the thickness of the resin layer is within these ranges, the various properties of the present invention described above can be more effectively achieved, the resin layer is easily formed by the application of the resin composition, and further, the handleabililty also improves.

The copper foil may be a metal foil in an electrodeposited or rolled state (so-called raw foil) or may be in the form of a surface-treated foil having at least either one surface subjected to surface treatment. The surface treatment can be various types of surface treatments performed in order to improve or provide some properties (for example, rust proofing properties, moisture resistance, chemical resistance, acid resistance, heat resistance, and adhesion to a substrate) on the surface of a metal foil. The surface treatment may be performed on at least one surface of a metal foil or on both surfaces of a metal foil. Examples of the surface treatment performed on a copper foil include rust proofing treatment, silane treatment, roughening treatment, and barrier formation treatment.

The ten-point average roughness Rzjis on the surface of the copper foil on the resin layer side measured in accordance with JIS B0601-2001 is preferably 0.5 µm or less, more preferably 0.4 µm or less, further preferably 0.3 µm or less, and particularly preferably 0.2 µm or less. When the ten-point average roughness Rzjis is within such ranges, that is, the copper foil is a non-roughened copper foil in which the surface of the copper foil on the resin layer side is smooth, the haze value can be lowered, and therefore, while the high transparency of the resin layer is maintained, the adhesion between the copper foil and the resin layer can be ensured to lead a smaller thickness of the resin layer. The lower limit value of the ten-point average roughness Rzjis on the surface of the copper foil on the resin layer side is not particularly limited, but in view of the improvement of the adhesion to the resin layer, Rzjis is preferably 0.005 µm or more, more preferably 0.01 µm or more, and further preferably 0.05 µm or more.

The thickness of the copper foil is not particularly limited but is preferably 0.1 µm or more and 100 µm or less, more preferably 0.5 µm or more and 70 µm or less, further preferably 1 µm or more and 50 µm or less, particularly preferably 1.5 µm or more and 20 µm or less, and most preferably 2 µm or more and 5 µm or less. When the thickness is within these ranges, a fine circuit that does not impair visibility can be formed advantageously. However, when the thickness of the copper foil is, for example, 10 µm or less, the resin-attached copper foil of the present invention may be a carrier-attached copper foil including a release layer and a carrier for handleability improvement and also a resin layer formed on the copper foil surface.

EXAMPLES

The present invention will be more specifically described by the following examples.

Examples 1 to 14

(1) Preparation of Resin Varnish

First, as material components for a resin varnish, the component (a) to the component (d) shown below were provided. In addition, an acrylic polymer that did not meet the requirement of the component (a) was also provided as an (a') component for comparison.

component (a) (acrylic polymer): ethylene acrylic rubber having carboxyl group (manufactured by DuPont, Vamac®, product number: HT-OR) (tensile modulus measured in accordance with JIS K7161-1: 2014: 3.5 MPa)

component (a') (acrylic polymer): acrylic block polymer (manufactured by KURARAY CO., LTD., product name: KURARITY®, product number: LA4285) (tensile modulus measured in accordance with JIS K7161-1: 2014: 380 MPa)

component (b) (resin that is solid at 25° C.): acrylic resin having carboxyl group (manufactured by Toagosei Co., Ltd., ARUFON®, product number: UC-3900)

component (c) (resin that is liquid at 25° C.): liquid alicyclic epoxy resin (manufactured by DAICEL CORPORATION Organic Chemical Products Company, CELLOXIDE, product number: 2021 P)

component (d) (polymerization initiator): radical polymerization initiator (manufactured by SANSHIN CHEMICAL INDUSTRY CO., LTD., SAN-AID, product number: SI-B5)

The material components for a resin varnish were weighed into a round flask in a blending ratio (weight ratio) shown in Table 1, and a mixed solvent was added so that the concentration of the material components for a resin varnish was 25% by weight. This mixed solvent was composed of 80% by weight of toluene, 15% by weight of methyl ethyl ketone, and 5% by weight of dimethylacetamide. The round flask containing the material components for a resin varnish and the mixed solvent was equipped with a heating mantle, a stirring blade, and a flask lid with a reflux condenser tube, and heated to 60° C. with stirring, and then the stirring was continued at 60° C. for 1 hour to dissolve the material components for a resin varnish. The mixed solution obtained after the stirring was allowed to cool to obtain a resin varnish.

(2) Fabrication of Resin Film

The obtained resin varnish was applied to a surface of a copper foil ("MT18-G" manufactured by MITSUI MINING & SMELTING CO., LTD.) using a comma coater so that the thickness of the resin after drying was 50 µm, and the resultant was dried in an oven at 150° C. for 5 minutes to obtain a resin-attached copper foil. Two of the obtained resin-attached copper foils were bonded so that their resins abutted each other, and subjected to hot vacuum pressing under the heating and pressurization conditions of 180° C., 90 minutes, and 3 kgf/cm² to fabricate a double-sided copper-clad laminate. The copper on both surfaces of the obtained double-sided copper-clad laminate was all removed by etching to obtain a resin film having a thickness of 100 µm.

(3) Fabrication of Glass Laminate

The obtained resin varnish was applied to a surface of a copper foil ("MT18-G" manufactured by MITSUI MINING & SMELTING CO., LTD.) using a gravure coater so that the thickness of the resin after drying was 5 µm, and dried in an oven at 150° C. for 3 minutes to obtain a resin-attached copper foil. The obtained resin-attached copper foil was cut into a size of 100 mm×100 mm and bonded to glass having a size of 100 mm×100 mm and a thickness of 0.5 mm so that the resin abutted the glass. The obtained laminate was subjected to vacuum laminate molding under the heating conditions of 150° C. and 1 minute to obtain a glass laminate.

(4) Various Evaluations

For the fabricated glass laminate, the following evaluations were performed.

Evaluation 1: Peel Strength

Copper wiring having a wiring width of 10 mm and a wiring thickness of 20 μm was formed on the fabricated glass laminate by a modified semi-additive process (MSAP), and the peel strength was measured in accordance with JIS C 6481. The measurement was carried out in quintuplicate, and the average value was taken as the value of the peel strength. It was evaluated according to the following criteria. The peel strength measured here is a value that reflects three fracture modes, glass/resin interfacial peeling, cohesive failure in the resin, and resin/copper foil interfacial peeling. A higher value means that the resin composition is more highly excellent in the adhesion to the glass, the strength of the resin layer, and the adhesion to the low roughness foil. The results were as shown in Table 1.
Rank A: 0.8 kgf/cm or more
Rank B: 0.3 kgf/cm or more and less than 0.8 kgf/cm
Rank C: less than 0.3 kgf/cm

Evaluation 2: Warpage

For the glass laminate obtained in (3), the warpage of the substrate was measured using an apparatus for 3D analysis of the shape of a heated surface (manufactured by akrometrix, TherMoire PS200S). The warpage was calculated from the difference between the maximum value and the minimum value of the Z coordinate of the glass laminate. The measurement was performed in a 27° C. atmosphere in quintuplicate, and the average value of the found values was taken as the warpage. It was evaluated according to the following criteria. The results were as shown in Table 1.
Rank A: less than 700 μm
Rank B: 700 μm or more and less than 900 μm
Rank C: 900 μm or more

Evaluation 3: Elongation at Break

The resin film obtained in (2) was cut into a size of 10 mm×150 mm, and the elongation at break (%) was measured in accordance with JISK7161-1: 2014 using Autograph (manufactured by SHIMADZU CORPORATION). At this time, the chuck distance of Autograph was 50 mm, and the tensile speed was 50 mm/min. The measurement was performed in quintuplicate, and the average value of the found values was taken as the elongation at break. It was evaluated according to the following criteria. The results were as shown in Table 1.
Rank A: 500% or more
Rank B: 200% or more and less than 500%
Rank C: less than 200%

Evaluation 4: Transparency

The resin film obtained in (2) was visually observed, and the transparency was evaluated according to the following criteria. The results were as shown in Table 1.
Rank A: the resin film looks transparent without turbidity
Rank C: the resin film looks turbid and opaque

TABLE 1

| | | | Ex. 1* | Ex. 2 | Ex. 3 | Ex. 4 | Ex. 5 | Ex. 6 | Ex. 7 |
|---|---|---|---|---|---|---|---|---|---|
| Blending ratio of components in resin composition (parts by weight) | (a) | HT-OR | 95.0 | 90.0 | 80.0 | 70.0 | 60.0 | 50.0 | 40.0 |
| | (a') | LA4825 | | | | | | | |
| | (b) | UC-3900 | | 5.00 | 15.0 | 25.0 | 35.0 | 45.0 | 55.0 |
| | (c) | 2021P | 5.00 | 5.00 | 5.00 | 5.00 | 5.00 | 5.00 | 5.00 |
| | (d) | SI-B5 | 0.005 | 0.005 | 0.005 | 0.005 | 0.005 | 0.005 | 0.005 |
| | Weight ratio a/b | | ∞ | 18 | 5.4 | 2.8 | 1.7 | 1.1 | 0.7 |
| | Weight ratio c/d | | 1000 | 1000 | 1000 | 1 000 | 1000 | 1000 | 1000 |
| Evaluation results | Peel strength (kgf/cm) | | 0.24 | 0.34 | 0.45 | 0.61 | 0.77 | 0.89 | 0.41 |
| | | | C | B | B | B | B | A | B |
| | Warpage (μm) | | 390 | 390 | 470 | 430 | 560 | 630 | 890 |
| | | | A | A | A | A | A | A | B |
| | Elongation at break (%) | | >850 | >850 | 630 | 650 | 740 | 530 | 310 |
| | | | A | A | A | A | A | A | B |
| | Transparency | | A | A | A | A | A | A | A |

| | | | Ex. 8* | Ex. 9* | Ex. 10 | Ex. 11 | Ex. 12 | Ex. 13* | Ex. 14* |
|---|---|---|---|---|---|---|---|---|---|
| Blending ratio of components in resin composition (parts by weight) | (a) | HT-OR | 30.0 | 36.8 | 44.7 | 47.4 | 51.1 | 52.6 | |
| | (a') | LA4825 | | | | | | | 50.0 |
| | (b) | UC-3900 | 65.0 | 33.2 | 40.3 | 42.6 | 45.9 | 47.4 | 45.0 |
| | (c) | 2021P | 5.00 | 30.0 | 15.0 | 10.0 | 3.00 | | 5.00 |
| | (d) | SI-B5 | 0.005 | 0.005 | 0.005 | 0.005 | 0.005 | 0.005 | 0.005 |
| | Weight ratio a/b | | 0.5 | 1.1 | 1.1 | 1.1 | 1.1 | 1.1 | 0 |
| | Weight ratio c/d | | 1000 | 6000 | 3000 | 2000 | 600 | 0 | 1000 |
| Evaluation results | Peel strength (kgf/cm) | | 0.06 | 0.84 | 0.98 | 0.83 | 0.76 | 0.04 | 0.42 |
| | | | C | A | A | A | B | C | B |
| | Warpage (μm) | | 890 | 920 | 690 | 650 | 790 | 660 | 1050 |
| | | | B | C | A | A | B | A | C |
| | Elongation at break (%) | | 3 | 20 | 270 | 250 | 630 | 550 | 120 |
| | | | C | C | B | B | A | A | C |
| | Transparency | | A | A | A | A | A | A | A |

*indicates a comparative example.
(a') means an acrylic polymer that does not meet the requirement of the component (a).

The invention claimed is:

1. A resin composition comprising the following components:
   (a) an acrylic polymer having a tensile modulus of 200 MPa or less as measured in accordance with JIS K7161-1:2014;
   (b) a resin that is solid at 25° C.;

(c) a resin that is liquid at 25° C. and crosslinkable with at least one of the component (a) and the component (b); and
(d) a polymerization initiator,
wherein the resin composition contains
the component (a) in an amount of 35 parts by weight or more and 93 parts by weight or less,
the component (b) in an amount of 3 parts by weight or more and 60 parts by weight or less, and
the component (c) in an amount of 1 part by weight or more and 25 parts by weight or less,
based on 100 parts by weight of a total amount of the component (a), the component (b), and the component (c);
wherein a weight ratio of the component (c) to the component (d) is 700 or more and 5000 or less; and
wherein the resin composition has transparency after curing.

2. The resin composition according to claim 1, having a weight ratio of the component (a) to the component (b), a/b, of 0.6 or more and 18 or less.

3. The resin composition according to claim 1, having a weight ratio of the component (c) to the component (d), c/d, of 800 or more and 5000 or less.

4. The resin composition according to claim 1, wherein at least one of the component (a) or the component (b) has a carboxyl group, and the component (c) is a liquid alicyclic epoxy compound.

5. The resin composition according to claim 1, having an elongation at break of 200% or more as measured in accordance with JIS K7161-1:2014 after curing.

6. A resin-attached copper foil comprising:
a copper foil including a smooth surface; and
the resin composition according to claim 1 provided on the smooth surface.

7. A composite material comprising:
a glass substrate; and
the resin composition according to claim 1 provided on at least one surface of the glass substrate.

* * * * *